(12) United States Patent
Liu et al.

(10) Patent No.: US 11,295,061 B2
(45) Date of Patent: Apr. 5, 2022

(54) DYNAMIC LAYOUT ADJUSTMENT FOR REFLOWABLE CONTENT

(71) Applicant: Amazon Technologies, Inc., Seattle, WA (US)

(72) Inventors: Wenqiong Liu, Seattle, WA (US); Prannoy Chacko Vargis, Seattle, WA (US); Zhixuan Wang, Seattle, WA (US); Aayush Chhabra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/782,659

(22) Filed: Feb. 5, 2020

(65) Prior Publication Data

US 2021/0240912 A1    Aug. 5, 2021

(51) Int. Cl.
*G06F 40/114* (2020.01)
*G06F 40/106* (2020.01)
*G06K 9/00* (2022.01)

(52) U.S. Cl.
CPC .......... *G06F 40/106* (2020.01); *G06F 40/114* (2020.01); *G06K 9/00463* (2013.01); *G06K 2009/00489* (2013.01)

(58) Field of Classification Search
None
See application file for complete search history.

(56) References Cited

U.S. PATENT DOCUMENTS

| 8,499,236 | B1 * | 7/2013 | Keljo ................ G06T 11/60 715/249 |
| 8,515,176 | B1 * | 8/2013 | Sankaranarayanan ................ G06K 9/00463 382/185 |
| 9,734,132 | B1 | 8/2017 | Kothandapani Shanmugasundaram et al. |
| 2007/0234203 | A1 | 10/2007 | Shagam et al. |
| 2011/0173532 | A1 * | 7/2011 | Forman ............... G06F 40/103 715/256 |
| 2013/0179771 | A1 * | 7/2013 | Dent .................. G06F 40/103 715/234 |

(Continued)

OTHER PUBLICATIONS

Anonymous: "Margin und Padding erklart—CSS Basics—WordPress1×1", retrieved from the Internet at https://web.archive.org/web/20161005103747/https://www.wp1×1.de/margin-padding/.

(Continued)

*Primary Examiner* — Rinna Yi
(74) *Attorney, Agent, or Firm* — Knobbe, Martens, Olson & Bear, LLP

(57) ABSTRACT

Systems and methods are provided for laying out reflowable content for display, such as content of an electronic book, in a manner that may differ from spacing properties originally defined in a corresponding reflowable file. When an amount of spacing that the reflowable file indicates should be included in a given line exceeds a threshold that is set based at least in part on the available line display length, the layout may be adjusted to decrease the total spacing for the line without adjusting the display size of reflow objects within the line. The adjusted layout may include utilizing a scaled down amount of space relative to the spacing properties defined in the reflowable file, or applying a different alignment type than is indicated by the reflowable file.

20 Claims, 7 Drawing Sheets

(56) References Cited

U.S. PATENT DOCUMENTS

2015/0324340 A1  11/2015  Tsui et al.

OTHER PUBLICATIONS

International Search Report and Written Opinion for International Application No. PCT/US2021/016428, dated May 14, 2021.

* cited by examiner

DYNAMIC LAYOUT ADJUSTMENT FOR REFLOWABLE CONTENT

BACKGROUND

Content providers, including publishers of books and other reading material, are publishing and distributing more and more content in electronic form. This content includes traditional media such as books, magazines, newspapers, newsletters, manuals, guides, references, articles, reports, documents, etc., that may also exist in physical print form. Publishers or content creators commonly reference the print design of a physical book (or magazine, or other publication) when designing a corresponding electronic version, such as an electronic book to be distributed and read on computers, mobile phones, tablets, electronic book readers, or other electronic devices.

When designing and creating electronic book files, many publishers or content creators do not fully consider that compared to a fixed print book layout, different reading users may often read electronic books or similar content across devices with a potentially wide range of different screen sizes, display resolutions, device orientations (such as portrait or landscape orientation), and reading settings (such as different fonts and font sizes). As a result, publishers may specify spacing and text properties in electronic book files that result in reasonable display to a viewing user on a certain sized screen with certain reading settings (such as ones where the viewable screen space and dimensions approximate a printed book's page or a certain display size referenced in creation of the electronic content), but results in inefficient usage of available display space or to loss of content (such as content falling outside of the viewable area of a display) when displayed to users on other devices or who are using other reading settings.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1B:
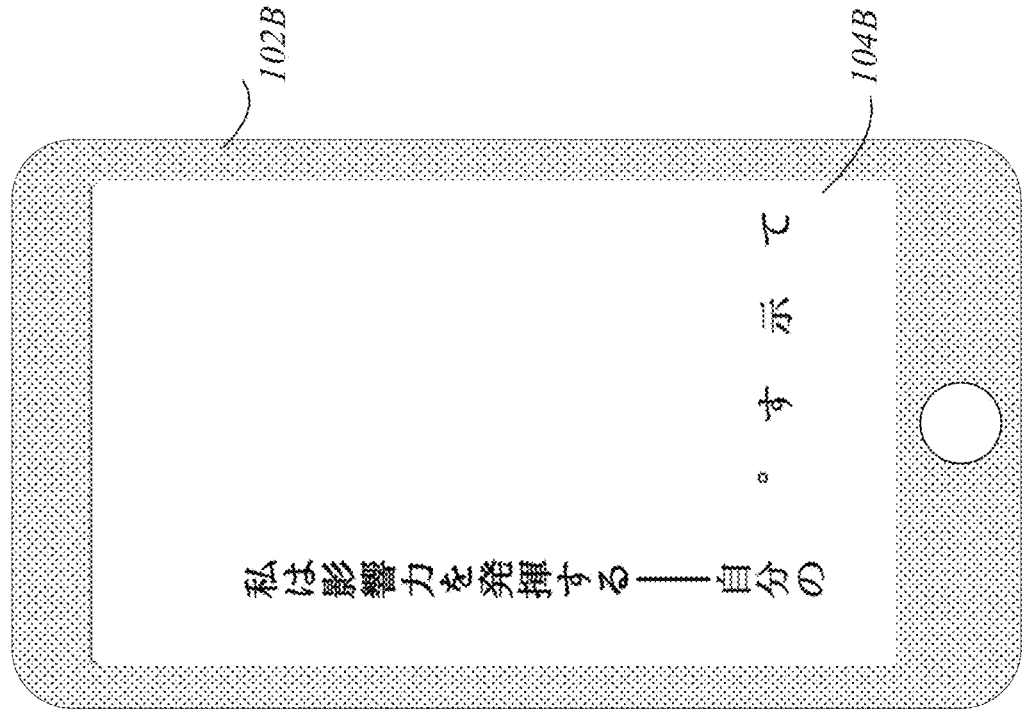
FIGS. 1A and 1B illustrate sample displays of content from a reflowable file on an electronic book reader device, using existing methods, at two different resolutions or reading settings.

Generally described, aspects of the present disclosure relate to dynamically adjusting spacing properties when displaying a reflowable file, such as an electronic book. The spacing may be adjusted, according to some embodiments, in situations where a system determines that applying the spacing as defined in the reflowable file would likely result in content layout that is unlikely to match the intent of the creator of the reflowable file and/or would cause content to appear outside of the visible display area of the output medium. For example, as discussed above, publishers commonly reference the design and formatting of a print book when setting spacing properties for a corresponding electronic book. This sometimes results in electronic books that specify indents, padding or other spacing that appears reasonable at certain display sizes and reading settings, but causes poor layout or content loss (e.g., content positioned outside of a displayable area) in other display situations. To address these and other problems, aspects of the present disclosure include methods for dynamically scaling down spacing or changing alignment settings for a particular line of text or objects at the time of display based on analysis of the current display settings and the specified spacing properties in the electronic book or other reflowable file.

As will be further described below, a system described herein may lay out a given line of reflowable content for display in a manner that may differ from the spacing properties originally defined in a corresponding reflowable file. For example, when an amount of spacing that the reflowable file indicates should be included in a given line exceeds a threshold that may be set based at least in part on the available line display length (such as the amount of spacing exceeding 90% of the available display length for a line), the layout for the line may be adjusted to decrease the total spacing for the line without adjusting the display size of reflow objects within the line. Determining the adjusted layout may include utilizing a scaled down amount of space relative to the spacing properties defined in the reflowable file, or applying a different alignment type than is indicated by the reflowable file. These and other approaches to dynamic spacing adjustment and/or alignment changes will be further described herein.

As is known in the field of digital publishing and typography, a reflowable file may contain content that can be laid out and displayed in a manner that adapts to different dimensions and sizes of output media, such as based on the available display space in a given instance. As is known, a reflowable file may include reflow objects that may be "reflowed" for presentation on a given sized window or display. To reflow content may generally refer to changing the line segmentation of reflow objects, such as causing a next reflow object in a file to be placed on a new line in the display area when it will not fit on the current line. Generally, reflow objects may include a selection of one or more letters, characters, symbols, numbers, graphics, etc., that may be presented for display.

As will be discussed below, aspects of the present disclosure may be particularly useful in embodiments in which each reflow object is a single character (such as a character in an Asian script or language), as opposed to reflow objects that may each include varying numbers of characters (such as English language words). A reflowable file will typically identify the characters or other content to be displayed as text data (such as using the Unicode standard or other format). As is known in the art, these characters may then be displayed as corresponding glyphs, such as a glyph used to represent a given character in a certain font or typeface used for display. In other instances, characters or other reflow objects may be defined by image data included in or associated with the reflowable file, such as described in U.S. Pat. No. 7,966,557, entitled "Generating Image-Based Reflowable Files for Rendering on Various Sized Displays." In further instances, the reflowable file may be a token-based reflowable file in which a reflow object is represented by vectorized tokens that each mathematically represent a shape in curves, as described in U.S. Pat. No. 7,460,710, entitled "Converting Digital Images Containing Text to Token-Based Files for Rendering." In some embodiments, a reflowable file may include a mix of font-based content (e.g., characters to be rendered as glyphs associated with a font) and image-based content (e.g., image data defined within the reflowable file that represents a unique character, graphic, emoji, and/or other visual content for display).

In some embodiments, a reflowable file as described herein may be a file in an electronic publication ("EPUB") format or a proprietary file format that similarly relies at least in part on a markup language to indicate formatting and other display information. For example, such file formats may rely in part on Hypertext Markup Language (HTML), Extensible Markup Language (XML), and/or Cascading Style Sheets (CSS). For example, a reflowable file may include text intended for display, along with markup information that describes the style and/or structure of the textual content. As is known in the art, a single electronic book or other reflowable file may comprise multiple files or subfiles. For example, an EPUB file is typically implemented as an archive file that includes multiple files (such as one or more HTML files, style sheets, images, etc.).

While many languages, such as English, are written or displayed horizontally, with successive characters going from left to right within a line of text, and successive lines of text going from top to bottom, many Asian languages or scripts (such as Chinese, Japanese and Korean scripts) can be written either horizontally or vertically. For example, in digital publishing, an electronic book in such languages may be displayed in either a horizontal mode (which may be referred to as a horizontal writing mode or horizontal reading mode) or a vertical mode (which may be referred to as a vertical writing mode or vertical reading mode). In the vertical mode, successive characters within a line of text may go from top to bottom within a vertical line, and successive lines of text may go from right to left. Accordingly, in such instances, a reflow object that does not fit on the bottom of a current vertical line of text may be reflowed to the top of a successive line positioned to the left of the current line.

Figure 1A:
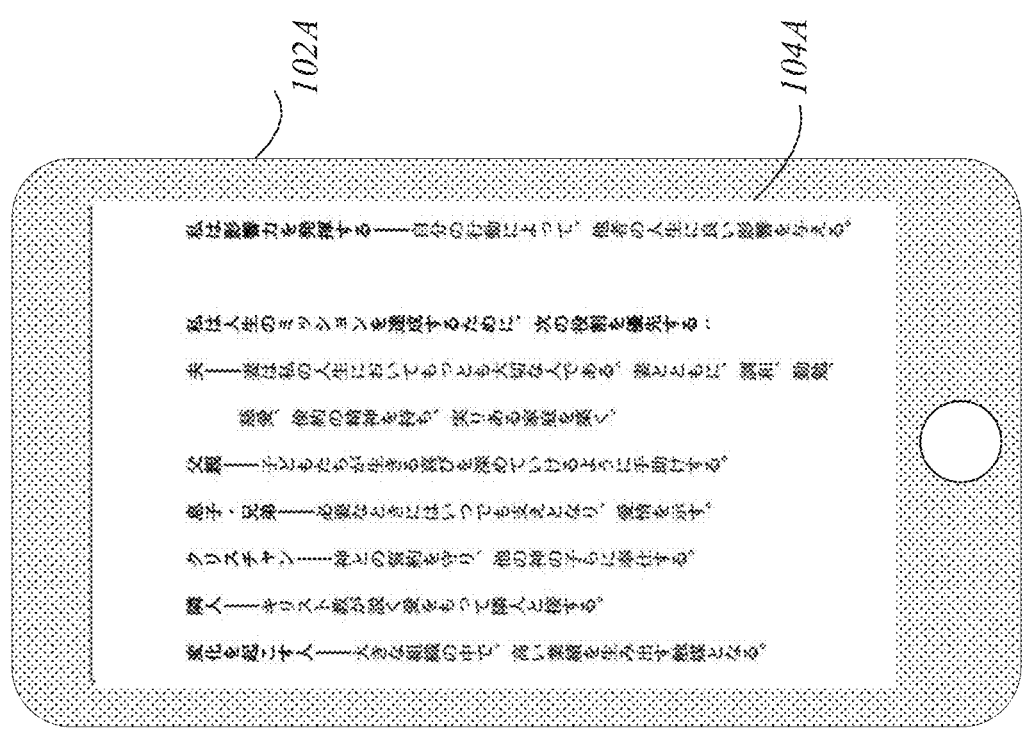

FIGS. 1A and 1B illustrate sample displays of content from a reflowable file on an electronic book reader device, using existing methods, at two different resolutions or reading settings. The electronic book or other reflowable file from which the content of FIGS. 1A and 1B is displayed may be the same between the two figures, but may be rendered according to different display settings or readings settings. FIGS. 1A and 1B illustrate how typical existing methods of displaying content from certain reflowable files can lead to content loss or otherwise undesirable output or visual arrangement of content.

Device 102A in the given example may be, for example, an electronic book reader device, a mobile phone, or a tablet computing device. The displayed content 104A displayed on a screen of device 102A is content of a Japanese electronic book displayed in a vertical writing mode (e.g., characters in vertical lines, reading top to bottom, with successive lines positioned from right to left, as discussed above). As displayed in FIG. 1A, the device 102A may be configured with reading settings that include a relatively small font size. At this small font size, the layout and text positioning of the content appears reasonable and may at least approximate the layout intent of the publisher (or other creator of the electronic book file).

The electronic book content being presented may, for example, include spacing in a unit (such as em units) that scales with the font size. As is known in the art, one em generally scales to the current font size, such as one em equaling 8 points for an 8-point font size. For example, if the electronic book indicates padding of a certain fixed number of em units for a given line (e.g., the file includes a property such as "padding: 5 em"), the amount of padding or white space included prior to the first displayed character in that line according to existing methods would typically scale to be a greater number of total pixels the higher the selected font point size is. The total amount of spacing in a given line may be based on a combination of spacing and/or text properties defined in the electronic book, such as a padding amount, a margin amount, a border amount, and/or an indent amount, among others.

FIG. 1B illustrates the effect of increasing the font size with respect to the content of FIG. 1A on the same device 102B as device 102A above, according to typical existing display methods. As illustrated, at this relatively higher font size (even with the same screen size and resolution as in FIG. 1A), the spacing properties of the electronic book have caused a large amount of white space or blank space to be displayed with little reflowable text visible (e.g., a single character in most vertical lines) in the displayed content 104B. This may be based on a combination of scaled spacing properties (e.g., padding, margins, borders and/or indents) defined in the file. If the font size were increased further, there would be content loss (e.g., content positioned below the visible portion of the display area) according to typical existing display methods, such as shown in FIG. 5A described below. This may be due to the need to include at least one character following the padding or indent property specified in a reflowable file, even if the character will not fit on the screen or output medium. These and other display problems associated with existing layout approaches are addressed by methods described below.

Figure 2:
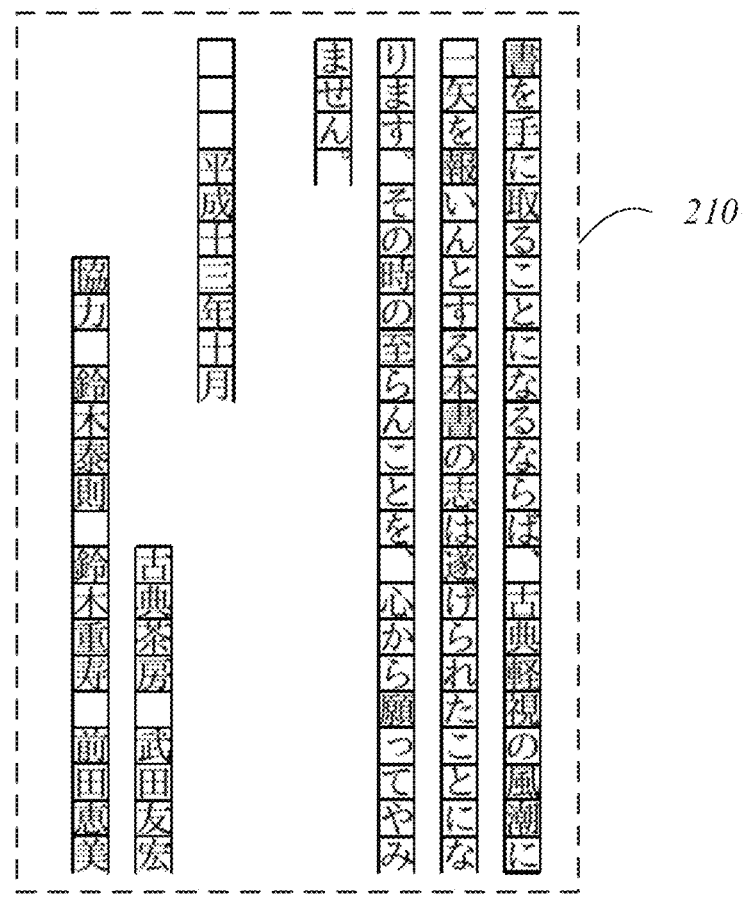
FIG. 2 illustrates sample grid layouts of reflow objects for two differently sized and oriented display areas.
Figure 2:
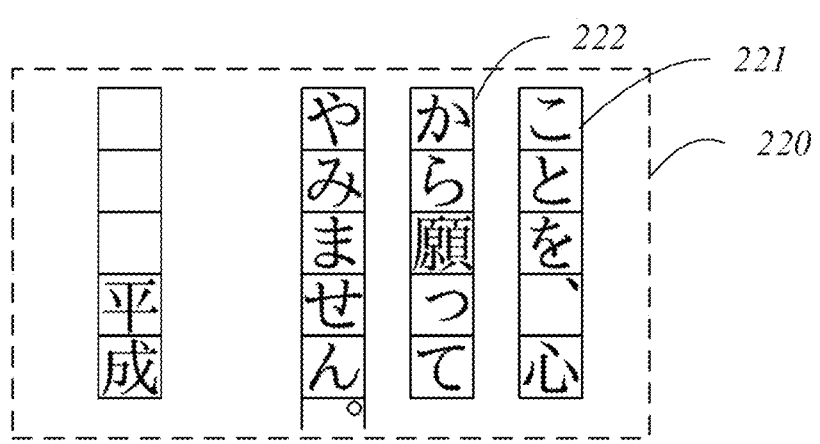

FIG. 2 illustrates sample grid layouts of reflow objects for two differently sized and oriented display areas. Example grid layout 210 may be a layout determined for display on a particular device in portrait orientation, while grid layout 220 may be a layout determined for display on a device in landscape orientation. Apart from their different display area sizes and orientations, layout 210 and layout 220 differ in their font size (point size) as well, with layout 220 utilizing a larger font size than layout 210. The grid markers (shown as boxes surrounding individual characters) are for illustrative purposes to identify layout information determined prior to display, and would not be displayed on a screen or otherwise shown to a user.

In the illustrated examples of FIG. 2, content is laid out in a grid form, which may be used in certain Asian language electronic books. In the illustrated examples 210 and 220, each box or entry in the displayed grids contains a single character or reflow object. The characters are laid out in a vertical reading mode, such that vertical line of characters 221 would be read top to bottom prior to reading vertical line of characters 222. Each grid box may be considered one em unit, with the display size of one em being determined by the point size or font size used for display (which may be set or adjusted by the viewing user or reader application preferences, for example). As illustrated in layout 210, the blank space preceding certain vertical lines (e.g., space not shown with grid markings) may be placed in the layout based on spacing parameters such as padding or indents indicated in the reflowable file.

Figure 3:
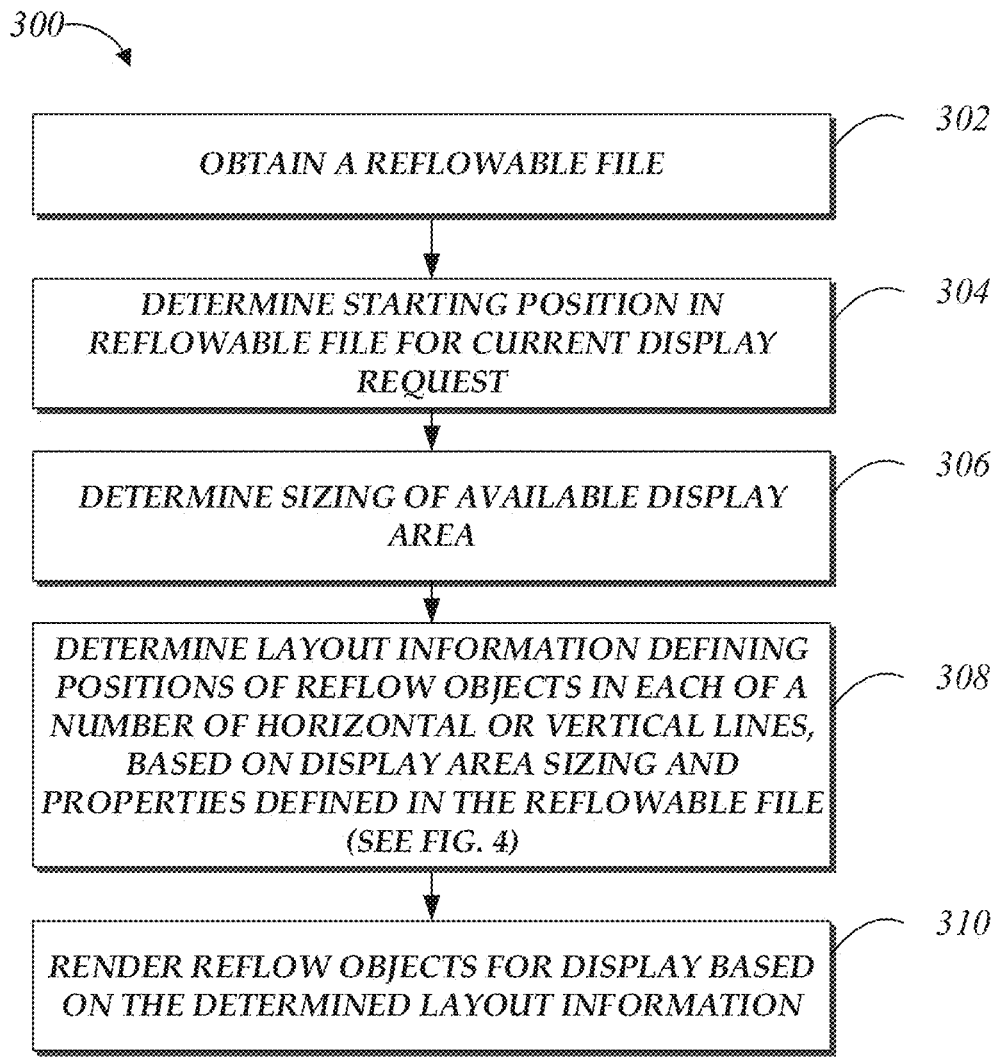
FIG. 3 is a flow diagram of an illustrative method for displaying content from a reflowable file, such as an electronic book.

FIG. 3 is a flow diagram of an illustrative method 300 for displaying content from a reflowable file, such as an electronic book. The illustrative method 300 may be performed by a computing system or device such as computing system 610 described below. The method 300 begins at block 302, where the computing system may obtain a reflowable file, such as by retrieving the file from an electronic data store. The file may be obtained in response to a request from a user to read at least a portion of an electronic book or other reflowable file. At block 304, the computing system may then determine a starting position in the reflowable file for the current display request. In some instances the starting position may be the beginning of the displayable content of the file, while in other embodiments the starting positon may be elsewhere in the file (such as if a user is requesting to resume reading from a point that the user last read the electronic book).

At block 306, the computing system may determine sizing of the available display area. In embodiments in which an entire screen or other display will be used to display content of the reflowable file, the total screen dimensions (e.g., width and height in pixels) may be determined. If instead the reflowable file will be displayed within a window, container, or other portion of the screen or other output medium, the dimensions of that space may be determined (e.g., width and height in pixels). Next, at block 308, the computing system may determine layout information defining positions of reflow objects in each of a number of horizontal or vertical lines, which may be based at least in part on the display area sizing as well as properties (such as text properties and spacing properties) defined in the reflowable file. Specific layout steps and dynamic spacing adjustment options will be described in detail with respect to FIG. 4 below.

At block 310, the computing system may render the reflow objects for display based on the determined layout information. As is known in the art, reflow objects may be rendered in a number of ways once their display positions have been determined. In some embodiments, individual reflow objects (such as characters in an Asian script) may be rendered as a corresponding glyph assigned to that character in a current font selected for the display of the electronic book or other file. Some example known manners of laying out and rendering reflowable content are described in more detail, for example, in U.S. Pat. No. 8,499,236, entitled "Systems and Methods for Presenting Reflowable Content on a Display."

Figure 4:
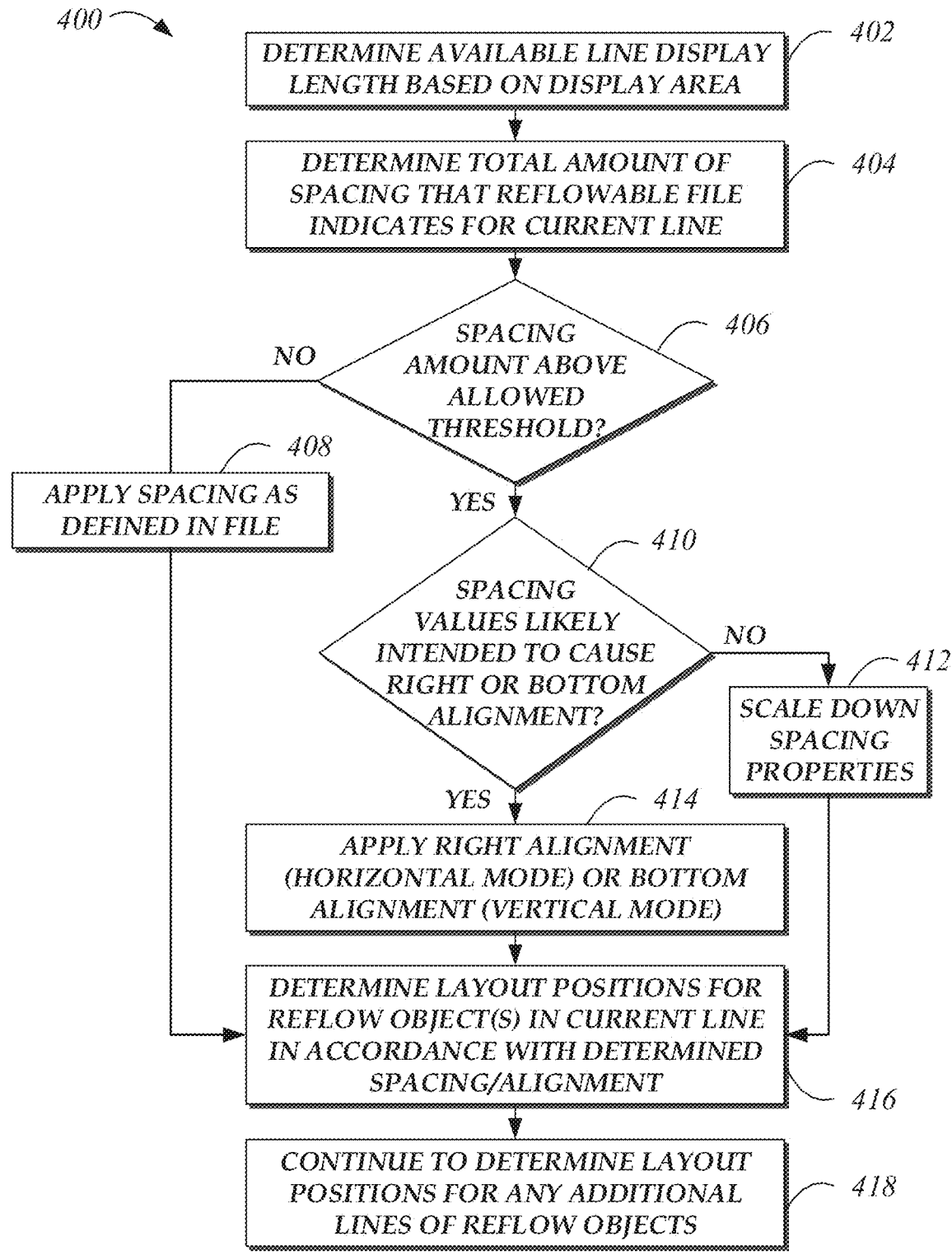
FIG. 4 is a flow diagram of an illustrative method for determining layout information for reflow objects in a reflowable file, including adjusting spacing properties for an individual line of reflow objects.

FIG. 4 is a flow diagram of an illustrative method 400 for determining layout information for reflow objects in a reflowable file, including adjusting spacing properties for an individual line of reflow objects. The illustrative method 400 may be performed by a computing system or device such as computing system 610 described below. In some embodiments, method 400 may be implemented as part of the determination of layout information referenced above with respect to block 308 of FIG. 3.

The illustrative method 400 begins at block 402, where the computing system may determine the available line display length based on the display area dimensions and display settings. The available line display length may refer to either the available width or height in which the current line of characters or other reflow objects may be laid out. In a horizontal writing mode, the line display length may refer to a width of the display area (where width refers to the left-to-right direction in the screen orientation currently being used by the device). In a vertical writing mode, the line display length may refer to a height of the display area (where height refers to the top-to-bottom direction in the screen orientation currently being used by the device).

The available line display length may be determined at block 402 either in a font size-independent form (such as em units, representing the number of characters that will fit on a line) or as a total number of pixels that can be rendered on the line, provided that the same units are used when determining the total amount of spacing for the line (discussed below with respect to block 404). In one embodiment with respect to a vertical writing mode, the available line display length is determined in em units by dividing the pixel height of the available display area by the current point size of the font being used for display (e.g., dividing by 16 for a 16-point font size).

At block 404, the computing system may determine the total amount of spacing that the reflowable file indicates should be shown in the current line based on the spacing properties specified in the file. In some embodiments, the total spacing may refer to spacing other than single "space" characters (e.g., may refer to specified border lengths, indent lengths, margin lengths, padding lengths, etc., but not a single space character that appears between two words or characters). The spacing may be determined by first normalizing the units of all of the spacing properties indicated in the file to be the same units determined for the display length (at block 402 above), such as converting points to em units (or vice versa) based on the current font sizing and other settings. The one or more spacing properties determined to affect the current line may then be added together in their normalized form. For example, if the file indicates that a border of 2 em and a padding of 15 em are applicable to the current line, the total amount of spacing may be determined to be 17 em for the current line.

At block 406, the computing system may determine whether the total spacing amount is above an allowed threshold. In some embodiments, the allowed threshold may be set as a predetermined percentage of the available line display length (e.g., 90%, in one embodiment). If the spacing amount specified in the file does not exceed the threshold percentage or other allowed amount, the method may proceed to block 408 to apply spacing as defined in the reflowable file when laying out objects for the current line. Otherwise, if the threshold is exceeded, the method proceeds to decision block 410.

At block 410, the computing system may determine whether the total spacing values defined in the reflowable file were likely intended (such as by the publisher, author or other creator of the file) to cause right alignment (in horizontal writing mode) or bottom alignment (in vertical writing mode). For example, the file may indicate a default alignment of left alignment should be used for the text of the body of a book, but the file creator may have inserted a large number of units of blank space prior to a given character via a padding property or other spacing property. It is often the case with Asian language books, particularly those where an electronic book was created to be laid out similarly to a physically printed book version, that large spacing properties (such as 35 em, for example) are inserted in the file with the assumption that the total displayable space in a line will match or be similar to the print version of the book (e.g., a 40 em line length in a standard Japanese vertical layout print book). Manually specified spacing properties that are close to the standard line length in print books would likely have appeared in print form to have the displayed characters of the line appear at the end of the line (e.g., right alignment of text in horizontal mode or bottom alignment of text in vertical mode), so such alignment or approximating such alignment was often the intention of the file creator in these circumstances.

Accordingly, in some embodiments at block 410, the computing system may determine if the total spacing for the line (as determined at block 404) exceeds a minimum threshold value that is set to trigger right alignment (or bottom alignment, in vertical mode). In one embodiment, the minimum threshold to trigger right or bottom alignment may be set as 32 em for Japanese language books, which may have been determined based on the typical Japanese language print books containing about 40 characters per line (and thus 32 em may have been selected as a value that is close to the line length while still allowing space for some characters). It will be appreciated that various right alignment trigger thresholds may be set for different language books, different types of books (e.g., books that are typically printed with fewer or greater number of characters or other reflow objects per line, such as reference books versus children's books), whether the book is designed for horizontal or vertical writing mode (which may be indicated by a property within an electronic book file), etc.

If it is determined at block 410 that the spacing indicated in the file was likely intended to cause right or bottom alignment (such as by the total spacing falling above a threshold that triggers such alignment), the method proceeds to block 414 to apply right alignment (if in horizontal writing mode) or bottom alignment (if in vertical writing mode). This alignment change may effectively ignore the file's specific spacing amount as well as replace the alignment type specified in the file for purposes of the current display line only, with the subsequent line returning to the alignment type (such as left alignment) specified in the file (unless the computing system separately determines to apply right alignment to the subsequent line according to the same method 400).

If it is instead determined at block 410 that the spacing indicated in the file was not likely intended to cause right or bottom alignment (such as by the total spacing falling below the threshold that triggers such alignment), the method proceed to block 412 to scale down the spacing properties that are specified in the reflowable file. For example, all of the spacing properties specified in the file as applicable to the current line (which may include a padding, border, margin, indent and/or others) may be scaled down by a scaling factor. The scaling factor may be set, in some embodiments, based on a standard line size for a print book in the given language and/or of the given book type. For example, as discussed above, a 40 em line length is often used in a typical Japanese vertical layout print book. Accordingly, for Japanese language electronic books, in some embodiments, 40 em may be considered a standard or normalized length per line. The scaling factor may be set as the current line display length (given the font size and other reading settings and display settings of the device) divided by the normalized length per line for the corresponding type of print book (which may also consider whether the book is designed for horizontal or vertical layout).

Thus, in one embodiment, if the current font size and screen size leads to a maximum display length of 20 em per line when displaying a given Japanese language electronic book (where 40 em is the normalized length per line), the scaling factor to scale down the spacing may be set as 0.5 (20/40). In this example, if the total spacing indicated in the file for the current line is a padding of 18 em, then the padding may be scaled down to 9 em (18×0.5). This adjustment may be made for the current line only, as discussed above, with subsequent lines separately analyzed for spacing adjustment according to method 400. It will be appreciated that the scale down factor may be determined and applied either to em units or pixel counts, depending on the embodiment. The resulting spacing determined from applying the scaling factor may be rounded, such as rounding to the closest grid position (e.g., one em unit) in a grid layout or to the nearest pixel at the edge of a grid.

At block 416, the computing system may determine layout positions for one or more reflow objects in the current line in accordance with the spacing and/or alignment determined above. As discussed above and shown in FIG. 4, the layout determination at block 416 may be reached from block 408 (where the file's indicated spacing is applied without change), block 414 (where bottom or right alignment is applied), or block 412 (where scaled down spacing properties will be used). Once block 416 is reached and the spacing and alignment has been determined, the layout positions of the characters or other reflow objects from the file may be determined using existing layout methods applied with reference to the revised spacing and/or alignment. For example, Japanese characters may be arranged in a grid format as described above with respect to FIG. 2.

Next, at block 418, the computing system may continue to determine layout positions for any additional lines of reflow objects that will fit in the current display area (e.g., will fit on the screen of the device). This may include reflowing (to the next line) one or more reflow objects that follow the last reflow object laid out in the current line, as well as obtaining additional reflow objects and applicable spacing properties from the file. As discussed above with respect to FIG. 3, once all reflow objects that will be displayed on the current display area (e.g., one screen or page of content) have been laid out, the content may be rendered for display in accordance with the determined layout.

FIG. 5A illustrates a sample display of content from a reflowable file on an electronic book reader device 502A using existing methods, in which content is not visible due in part to spacing properties defined in the reflowable file. As discussed above with respect to FIG. 1B, relatively large font sizes may cause content loss in electronic books or other reflowable files in which spacing properties are defined with reference to scalable units, such as em units that scale in display size with the font point size. This is illustrated by content 504A being rendered such that only a very small top portion of a few characters is visible at the bottom of the screen.

Figure 5B:
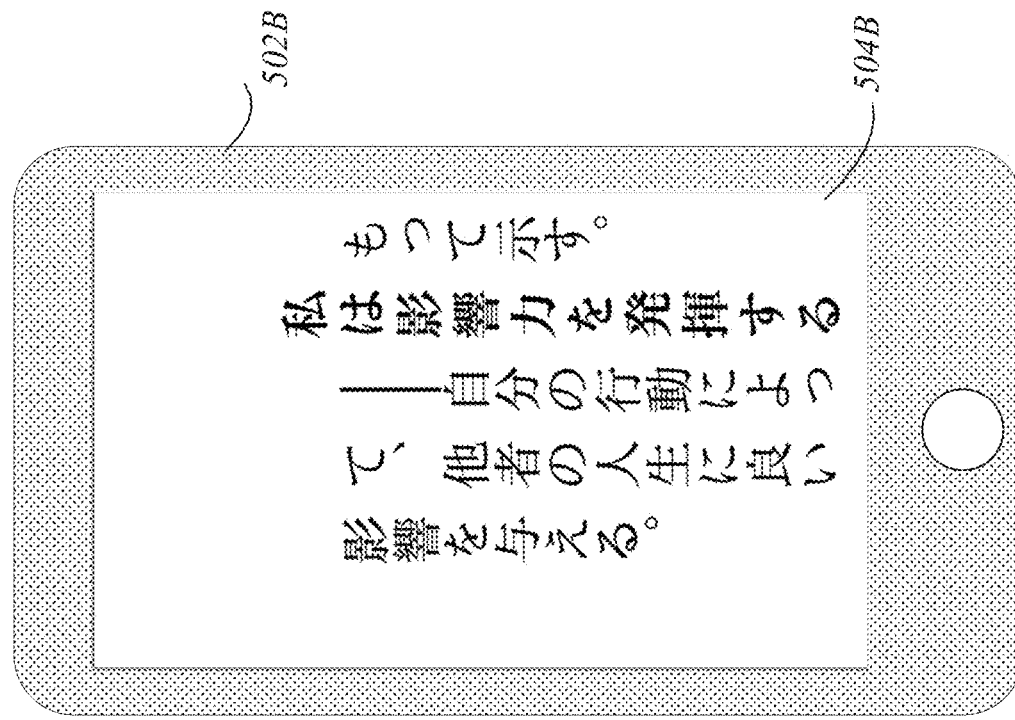
FIG. 5B illustrates a sample display of content from the same reflowable file in the same device setting as FIG. 5A, in which methods described herein have been applied to prevent content loss while causing the layout of content to still closely match the original intent of the creator of the reflow able file.
Figure 5A:
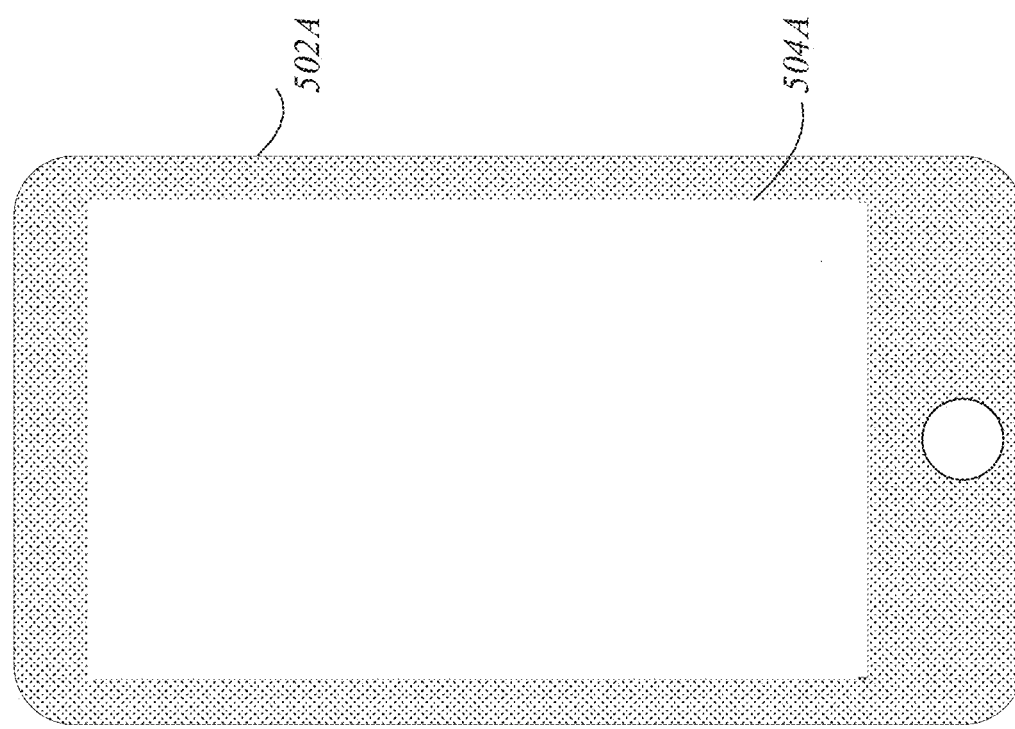
FIG. 5A illustrates a sample display of content from a reflowable file on an electronic book reader device using existing methods, in which content is not visible due in part to spacing properties defined in the reflowable file.

FIG. 5B illustrates a sample display of content 504B from the same reflowable file as FIG. 5A at the same font size and display settings (and potentially on the same device 502B as device 502A), in which methods described herein have been applied to cause the layout of content to better match a likely intent of the creator of the reflowable file. As illustrated, five lines of content are now fully visible and laid out in an easily readable manner. Some individual lines in displayed content 504B may have had bottom alignment applied according to method 400 described above, while others may have had scaled down spacing as described above. As will be appreciated, the font size has not been altered relative to FIG. 5A, though the spacing has been altered. This is in contrast to, for example, displaying non-reflow content such as an image file or Portable Document Format (PDF) file in which scaling content to fit a display screen would typically equally scale white space and visible text or glyphs.

Figure 5C:
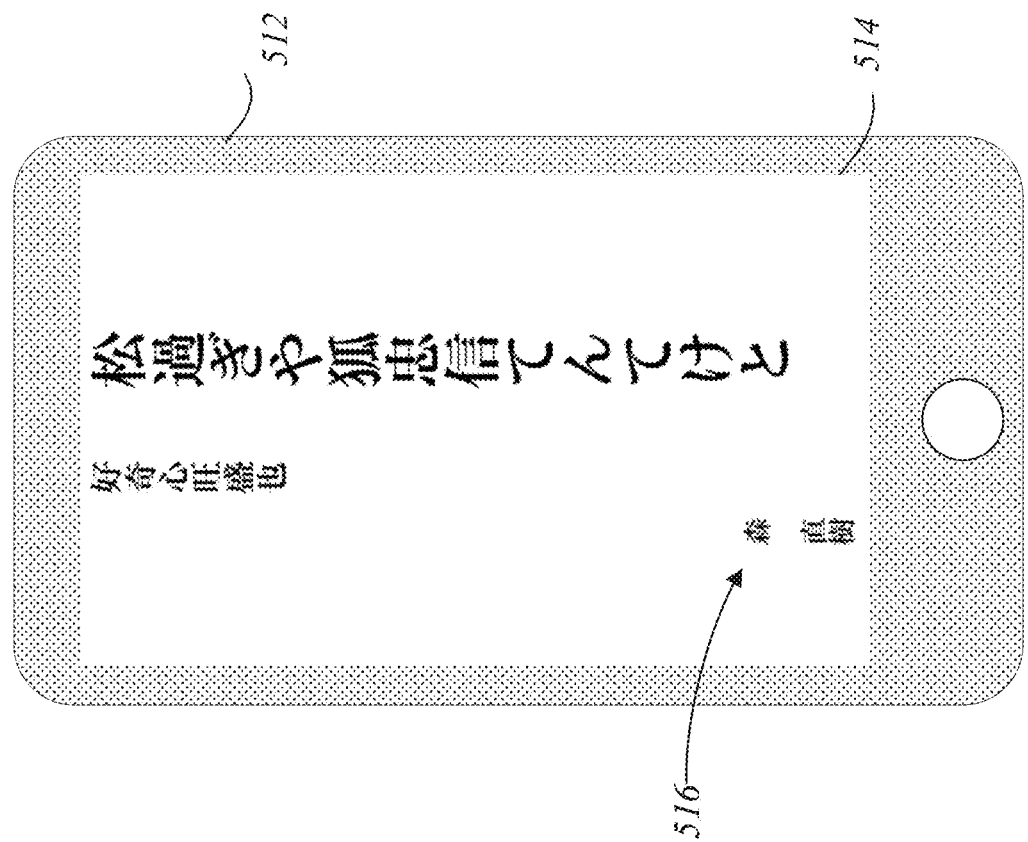
FIG. 5C illustrates a sample display of content from a reflowable file on an electronic book reader device, where the content layout has been adjusted to prevent content loss and change alignment of a line based on analysis of spacing properties defined in the reflowable file in order to closely match the original intended layout.

FIG. 5C illustrates a sample display of content 514 from a reflowable file on an electronic book reader device 512, where the content layout has been adjusted to change alignment of a vertical line 516 to be bottom aligned based on analysis of spacing properties defined in the reflowable file. According to methods described above, electronic book reader device 512 may have determined that line 516 would have been positioned at least partially outside of the viewable area (beneath the bottom of the screen) if laid out according to the spacing properties defined in the file. Accordingly, the reader device may have dynamically determined at the time of laying out the content for display that the alignment for line 516 should be adjusted to be bottom aligned instead of applying the spacing properties defined in the file. The reader device 512 may have determined that the remaining lines in the display of content 514 be laid out in accordance with the spacing properties defined in the file.

Figure 6:
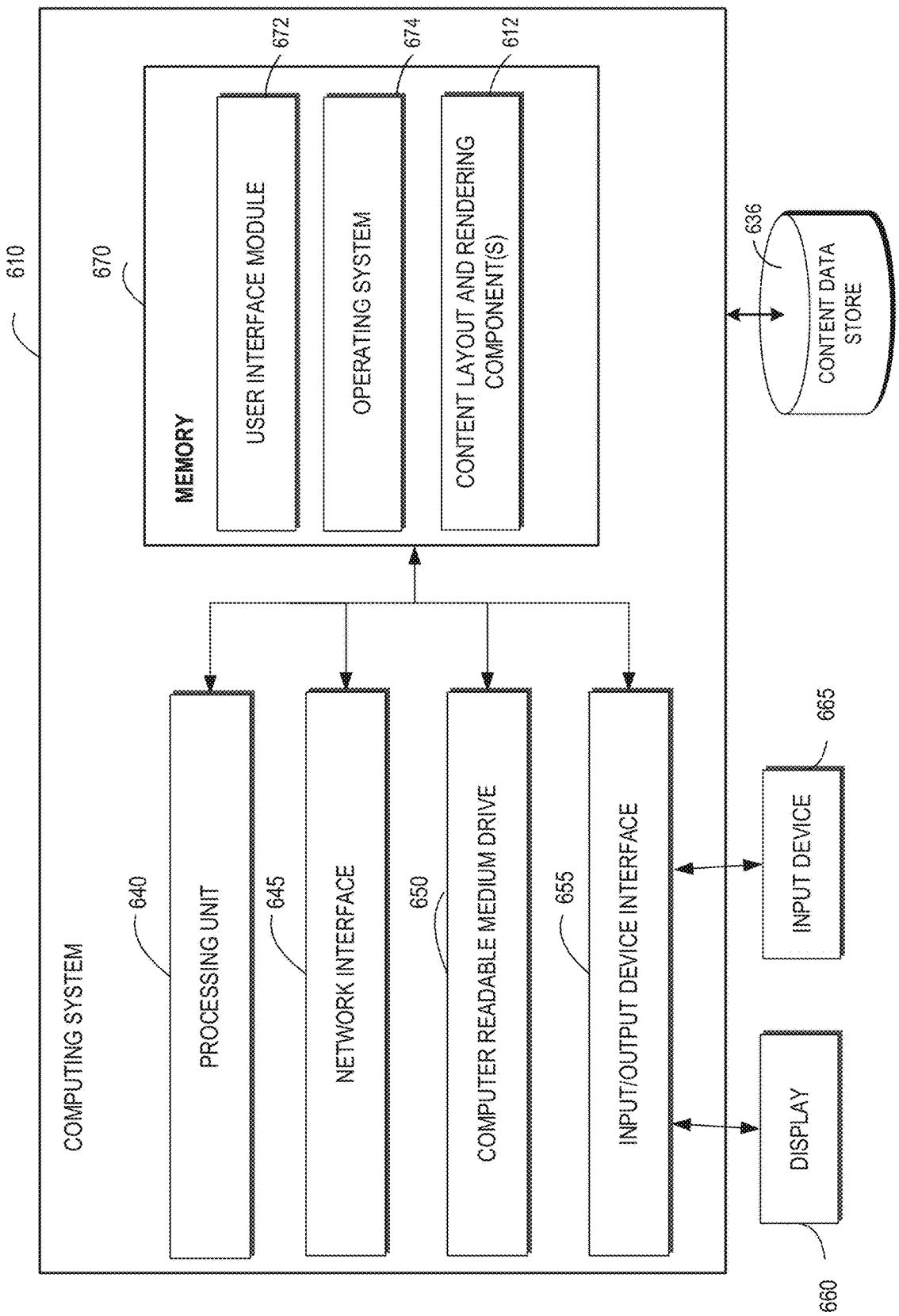
FIG. 6 is a block diagram depicting an illustrative architecture for a computing system that may implement one or more of the features described herein.

FIG. 6 depicts a general architecture of a computing system (which may be referred to herein as a computing device or electronic book reader, according to some embodiments) configured to implement various aspects of the present disclosure. The general architecture of the computing system 610 depicted in FIG. 6 includes an arrangement of computer hardware and software components. The computing system 610 may include many more (or fewer) elements than those shown in FIG. 6. It is not necessary, however, that all of these generally conventional elements be shown in order to provide an enabling disclosure. As illustrated, the computing system 610 includes a processing unit 640, a network interface 645, a computer readable medium drive 650, an input/output device interface 655, a display 660, and an input device 665, all of which may communicate with one another by way of a communication bus. The computing system may be embodied in a mobile phone, tablet computer, desktop computer, dedicated eBook reader or electronic book reader, and/or other computing device.

The network interface 645 may provide connectivity to one or more networks or computing systems. The processing unit 640 may thus receive information and instructions from other computing systems or services via a network. The processing unit 640 may also communicate to and from memory 670 and further provide output information for a display 660 via the input/output device interface 655. The input/output device interface 655 may also accept input from the input device 665, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 640 executes in order to implement one or more embodiments. The memory 670 generally includes RAM, ROM and/or other persistent, auxiliary or non-transitory computer readable media. The memory 670 may store an operating system 674 that provides computer program instructions for use by the processing unit 640 in the general administration and operation of the computing system 610. The memory 670 may further include computer program instructions and other information for implementing aspects of the present disclosure. For example, in one embodiment, the memory 670 includes a user interface module 672 that generates user interfaces (and/or instructions therefor) for display upon a computing device, e.g., via a navigation interface such as a browser or application installed on the computing device. In addition, memory 670 may include or communicate with a content data store 636, which may store electronic books, reflowable files, and/or other data or files described above.

The one or more content layout and rendering components 612 may be configured to obtain reflowable file data from the content data store and present it for display, including applying layout and rendering functionality described herein. For example, these component(s) 612 may be configured to implement the methods described above with respect to FIGS. 3 and 4, in some embodiments. While content layout and rendering components are shown in FIG. 6 as part of the same computing system 610 that presents the rendered content for display on a display 660, in other embodiments, all or a portion of the content layout and rendering components may be implemented by another computing system. For example, an electronic book reader device, personal computer or other computing device utilized by a reading user may communicate with a server or other remote computing system that implements the content layout and rendering components 612, and which returns an indication of the content to display (such as in the form of image data) by the computing system 610. Such a server or other remote computing system may include hardware and other components similar to those illustrated as part of computing system 610, though such a system may not include all such illustrated components (e.g., could exclude a display, input device, and/or others).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a non-transitory data store that stores an electronic book, wherein the electronic book is stored as one or more files comprising displayable content and formatting information, wherein the displayable content comprises a plurality of reflowable objects, wherein each reflowable object of at least a subset of the plurality of reflowable objects is represented in one of the one or more files by a character;
   at least one computing device configured with computer-executable instructions that, when executed, cause the at least one computing device to:
     receive a request to display a portion of the displayable content of the electronic book;
     determine an available line display length representing an amount of width or height available for laying out content for a current line, wherein the available line display length is one of (a) a width of a display area if in a horizontal writing mode or (b) a height of the display area if in a vertical writing mode;
     determine, based at least in part on spacing properties defined in the electronic book, an amount of spacing that the electronic book indicates should be included in the current line when laying out the portion of the displayable content for display, wherein the spacing properties comprise one or more of a padding, a margin, a border or an indent, wherein the amount of spacing represents one or more portions of the current line to be displayed as white space or blank space rather than visible text or image content;
     identify that the amount of spacing that the electronic book indicates should be included in the current line exceeds a threshold percentage of the available line display length, wherein the threshold percentage is a predetermined percentage that is less than one hundred percent;
     in response to identifying that the amount of spacing exceeds the threshold percentage, determine that the current line should be laid out in a different manner than is indicated by the spacing properties defined in the electronic book, wherein the different manner does not alter a display size of individual reflow objects to be displayed;
     select whether the different manner should be scaling down the spacing properties for the current line based on a scaling factor or changing an alignment property for the current line, wherein selection of the different manner is based at least in part on a comparison of the amount of spacing that the electronic book indicates to a minimum value, wherein the minimum value is previously associated with a rule to trigger one of (a) right alignment if in a horizontal writing mode or (b) bottom alignment if in a vertical writing mode;
     determine layout positions of one or more reflow objects from the portion of the displayable content in accordance with the selected different manner for laying out the current line, wherein an additional reflow object appearing subsequent to the one or more reflow objects in the displayable content are assigned to a position in a next line that follows the current line; and
     render the one or more reflow objects for display in accordance with the layout positions.

2. The system of claim 1, wherein the layout positions are arranged with reference to a grid, wherein relative positions of reflow objects in the grid represent respective relative display positions for rendering reflow objects for display.

3. The system of claim 1, wherein each of the one or more reflow objects is represented by a glyph when displayed.

4. The system of claim 1, wherein the current line is displayed in a vertical reading mode in which a first character in the current line is placed above a second character in the current line.

5. A computer-implemented method comprising:
   receiving a request to display displayable content of a reflowable file;
   determining an available line display length for a current line to be displayed, wherein the available line display length is one of (a) a width of a display area if in a horizontal writing mode or (b) a height of the display area if in a vertical writing mode;
   determining, based at least in part on spacing properties defined in the reflowable file, an amount of spacing that the reflowable file indicates should be included in the current line, wherein the spacing properties comprise one or more of a padding, a margin, a border or an indent, wherein the amount of spacing represents one or more portions of the current line to be displayed as white space or blank space rather than visible text or image content;

identifying that the amount of spacing that the reflowable file indicates should be included in the current line exceeds a threshold that is set based at least in part on the available line display length, wherein the threshold is set to be less than the available line display length;

in response to identifying that the amount of spacing exceeds the threshold, determining that the current line should be laid out in a different manner than is indicated by the spacing properties defined in the reflowable file, wherein the different manner does not alter a display size of individual reflow objects to be displayed;

selecting whether the different manner should be scaling down the spacing properties for the current line based on a scaling factor or changing an alignment property for the current line, wherein selection of the different manner is based at least in part on a comparison of the amount of spacing that the reflowable file indicates to a minimum value, wherein the minimum value is previously associated with a rule to trigger one of (a) right alignment if in a horizontal writing mode or (b) bottom alignment if in a vertical writing mode;

determining layout positions of one or more reflow objects from the portion of the displayable content in accordance with the selected different manner for laying out the current line, wherein an additional reflow object appearing subsequent to the one or more reflow objects in the displayable content are assigned to a position in a next line that follows the current line; and rendering the one or more reflow objects for display in accordance with the layout positions.

6. The computer-implemented method of claim 5, wherein the available line display length is based on one of (a) a width of a display area if in a horizontal writing mode or (b) a height of the display area if in a vertical writing mode.

7. The computer-implemented method of claim 5, wherein the available line display length is determined based at least in part on a size of a display area and a size of an em unit, wherein the size of the em unit is associated with a display size of an individual character at current reading settings.

8. The computer-implemented method of claim 6, wherein the layout positions are arranged with reference to a grid, wherein each individual entry in the grid is assigned a single reflow object, wherein relative positions of reflow objects in the grid represent respective relative display positions for rendering reflow objects for display.

9. The computer-implemented method of claim 5, wherein each of the one or more reflowable objects rendered for display is an individual Asian language character identified in the reflowable file and that is rendered as a glyph representing the individual Asian language character.

10. The computer-implemented method of claim 5, wherein the alternative amount of spacing is selected as the different manner in which to lay out the reflowable content for the current line, wherein the computer-implemented method further comprises:
determining the alternative amount of spacing based on a predefined scaling factor and the spacing properties for the current line.

11. The computer-implemented method of claim 5, wherein changing the alignment property is selected as the different manner in which to lay out the reflowable content for the current line, wherein the computer-implemented method further comprises:
determining from the spacing properties defined in the reflowable file that a creator of the reflowable file likely intended the current line to appear to have a different alignment than is indicated by an alignment property defined in the reflowable file; and
applying the different alignment for the current line instead of applying the spacing properties defined in the reflowable file.

12. The computer-implemented method of claim 9, wherein the reflowable content is laid out in a horizontal writing mode, wherein the different alignment is right alignment.

13. The computer-implemented method of claim 9, wherein the reflowable content is laid out in a vertical writing mode, wherein the different alignment is bottom alignment.

14. The computer-implemented method of claim 5, wherein the different manner of laying out the current line is not applied to a subsequent line rendered for display adjacent to the current line.

15. Non-transitory computer readable media including computer-executable instructions that, when executed by a computing system, cause the computing system to perform operations comprising:
receiving a request to display displayable content of a reflowable file;

determining an available line display length for a current line to be displayed, wherein the available line display length is one of (a) a width of a display area if in a horizontal writing mode or (b) a height of the display area if in a vertical writing mode;

determining, based at least in part on spacing properties defined in the reflowable file, an amount of spacing that the reflowable file indicates should be included in the current line, wherein the amount of spacing represents one or more portions of the current line to be displayed as white space or blank space rather than visible text or image content;

identifying that the amount of spacing that the reflowable file indicates should be included in the current line exceeds a threshold that is set based at least in part on the available line display length, wherein the threshold is set to be less than the available line display length;

in response to identifying that the amount of spacing exceeds the threshold, determining that the current line should be laid out in a different manner than is indicated by the spacing properties defined in the reflowable file, wherein the different manner does not alter a display size of individual reflow objects to be displayed;

selecting whether the different manner should be scaling down the spacing properties for the current line based on a scaling factor or changing an alignment property for the current line, wherein selection of the different manner is based at least in part on a comparison of the amount of spacing that the reflowable file indicates to a minimum value, wherein the minimum value is previously associated with a rule to trigger one of (a) right alignment if in a horizontal writing mode or (b) bottom alignment if in a vertical writing mode;

determining layout positions of one or more reflow objects from the portion of the displayable content in accordance with the selected different manner for laying out the current line, wherein an additional reflow object appearing subsequent to the one or more reflow objects in the displayable content are assigned to a position in a next line that follows the current line; and rendering the one or more reflow objects for display in accordance with the layout positions.

16. The non-transitory computer readable media of claim 15, wherein the spacing properties applicable to the current line as defined in the reflowable file comprise two or more of a padding, a margin, a border or an indent.

17. The non-transitory computer readable media of claim 15, wherein each of the two or more spacing properties are defined in the reflowable file by at least (a) a markup tag representing a spacing type and (b) an associated number of units representing a length of spacing for the corresponding spacing type.

18. The non-transitory computer readable media of claim 17, wherein determining the amount of spacing that the reflowable file indicates should be included in the current line comprises:

determining a sum of em units of the each of the two or more spacing properties; and determining a display length in pixels of the sum based on a current display size of an individual em unit.

19. The non-transitory computer readable media of claim 15, wherein the alternative amount of spacing is selected as the different manner in which to lay out the reflowable content for the current line, wherein the operations further comprise:

determining the alternative amount of spacing based on a scaling factor and the spacing properties for the current line.

20. The non-transitory computer readable media of claim 15, wherein changing the alignment property is selected as the different manner in which to lay out the reflowable content for the current line, wherein the operations further comprise:

determining from the spacing properties defined in the reflowable file that a creator of the reflowable file likely intended the current line to appear to have a different alignment than is indicated by an alignment property defined in the reflowable file; and applying the different alignment for the current line instead of applying the spacing properties defined in the reflowable file.

\* \* \* \* \*